Dec. 23, 1969 AISABURO YAGISHITA 3,485,909

PROCESS FOR PREPARING A FILTER MEDIUM

Filed June 20, 1967

INVENTOR.
Aisaburo Yagishita
BY
Attorney

United States Patent Office 3,485,909
Patented Dec. 23, 1969

3,485,909
PROCESS FOR PREPARING A FILTER MEDIUM
Aisaburo Yagishita, 50 Kamejima-cho, 3-chome,
Nakamura-ku, Nagoya, Japan
Filed June 20, 1967, Ser. No. 647,393
Int. Cl. B28b *1/16, 1/50;* B29h *9/00*
U.S. Cl. 264—122          3 Claims

ABSTRACT OF THE DISCLOSURE

In this process, porous particles of diatomaceous earth, porous carbon, or the like, are mixed with latently adhesive particles of calcined plaster, rubber, resin, or the like in a volumetric ratio of approximately 3 to 1. This dry mixture is placed in a mold through which a vaporized solvent is pumped under pressure for a predetermined time. Upon contacting the mixture the solvent condenses into a liquid which dissolves only the adhesive particles, and the mixture is thereafter heated to solidify the dissolved adhesive in a reticulated state to secure the porous particles together.

Figure 1:
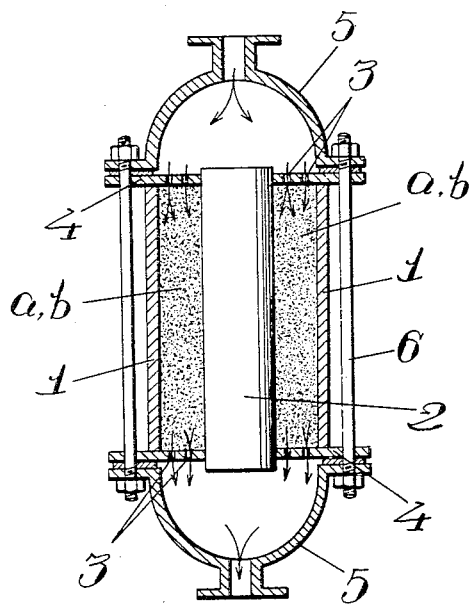

An object of the present invention is to provide a process for readily preparing a filter of desired shape, and having excellent filtration properties, by mixing in proper ratios porous filter particles of diatomaceous earth, porous carbon, or the like, with adhesive particles of calcined plaster, rubber, resin, or the like; molding the dry mixture thus obtained into a desired shape; moistening this mixture by pumping through the mixture a gaseous or vaporized solvent which condenses into a liquid that wets and dissolves the adhesive particles; and then curing the mixture to harden it in a porous state so that the desired shape of the filter, or filter medium, will be retained without detriment to the porosity of the filter.

The porous material employed in the present invention may be selected according to the particular use for which the filter is being produced. For instance, a mixture of diatomaceous earth and porous carbon can be used for filtering acid solutions; porous carbon may be used for filtering alkaline solutions; and a mixture of diatomaceous earth and ceramic particles may be used for filtering oily solutions. All of these porous materials are available on the open market, and filter efficiency can be altered without much difficulty by properly selecting the particle sizes of such porous materials.

The adhesive particles that are to be mixed with the porous particles may also be selected according to the particular substance that is to be filtered. Thus, particles of synthetic resin, natural rubber, pitch, or the like, are selected as the adhesive for filters that are to be used for filtering chemicals, medicines, and the like, and which, therefore, must be highly resistant to chemical corrosion; and adhesives such as plaster, natural rubber, or the like, are used to produce filters that are to be used for filtering air or oil. The particles sizes of the adhesive particles may be selected in much the same way as the porous particles are selected. However, the particle sizes of the adhesive particles will have a certain bearing on the efficiency of the filter. As a general rule, if the particle sizes of the adhesive particles used are larger than those of the porous particles, a filter with a higher degree of porosity can be obtained.

Figure 2:
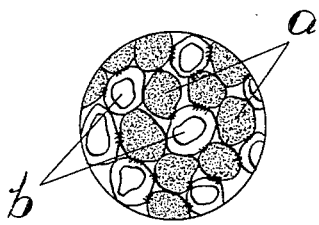

In the drawing:

FIG. 1 is a sectional view taken along the longitudinal axis of a tubular filter and a mold therefor that is used for performing this process in accordance with one embodiment of this invention; and FIG. 2 is an enlarged, cross sectional view of part of a filter produced in accordance with this novel process.

By way of explaining a preferred embodiment of this invention, reference is made to the accompanying drawing, which illustrates the process of making a tubular filter that is used for filtering air or oils. To produce this filter, particles *a* of diatomaceous earth, which have particle sizes of from 7 to 10$\mu$, are mixed throughly in a volumetric ratio of about 3 to 1 with particles *b* of calcined plaster, which have particle sizes of 20$\mu$ or thereabout. This dry mixture is packed in the mold 1 around a core 2, which is placed centrally of the mold 1 to form a hollow bore in the tubular filter product. End plates 4, 4, which are provided with openings 3, are then placed over the upper and lower ends of the mold 1, and the mixture is molded by compression molding. Secured to the outer faces of the end plates 4, 4 are two jackets 5, 5, which are fastened to the mold by tie rods 6 that pass at opposite ends through the jackets 5, 5 and the end plates 4, 4, and are secured against movement by conventional nuts.

A saturated water vapor is then pumped under pressure through the intake opening in one of the jackets 5 (the upper jacket in FIG. 1), and is permeated into and seeps through the mixture in the mold via the openings 3 in the end plates 4, as indicated by the arrows in FIG. 1, and the excess is discharged from the exhaust opening in the bottom jacket 5. As the saturated water vapor seeps through the mixture in the mold, the diatomaceous earth particles, and the pores therein, cool the vapor and cause it to condense into a liquid, or water drops, which cover the particles. At the same time, the adjacent particles of calcined plaster are dissolved, at least near their surfaces, by the water in its liquid form; and the particles of diatomaceous earth, which are in contact with the plaster solution that is created by the dissolved portions of the calcined plaster particles, are wetted with this plaster solution.

The pumping of the vapor into the mold 1 is continued for a total of about 3 to 5 minutes. Then, after the vapor supply is cut off, the product in the mold 1 is heated in any conventional manner to a temperature of about 150° centigrade until it has dried. This causes the moisture in the product to be dissipated so that the tiny pores in the particles of diatomaceous earth in the product once again becomes empty or free from moisture. At the same time, the calcined plaster solution is hardened in a porous or reticulate state, thus permitting gaseous products to filter or otherwise pass between the particles in the filter. Moreover, as the calcined plaster is hardened, it adheres closely to the diatomaceous earth particles, but it does not stop up all the tiny pores in the diatomaceous earth particles. In this way, the final filter product provides a high-quality filter medium having excellent permeability.

To provide a filter for filtering water, or two provide a filter which must be resistant to chemical corrosion, diatomaceous earth, porous carbon and natural rubber particles are employed in the same way as that described above. In this case, however, two parts by volume of particles of porous material, and one part by volume of rubber particles are dry mixed and compacted to the desired shape by means of a mold. Reinforcements, which will not interfere with the permeability of the filter, such as wire gauzes, may be inserted in the product at the time that it is placed in the mold. Then, gasoline, which is atomized to place it in vapor form, is supplied under pressure to the inlet of the mold for a limited time, and is allowed to permeate or seep through the mixture in the mold in a manner similar to that described above. This procedure is carried out for from 10 to 20 minutes, so that as the gasoline passes through the mixture in the mold, the excess thereof will be discharged through the exhaust port in the mold, and the remainder will be condensed by the mixture into liquid form, and will remain in the mold where it will wet and start to dissolve the rubber particles in the mixture. After approximately 20 minutes, the supply of vaporized gasoline is terminated, and the mixture in the mold is heated in any conventional manner to approximately 50° centigrade or thereabout until it is dry. This causes the previously dissolved rubber particles to solidify and harden in a reticulate state, thus adhering together the porous particles in the mixture, so that the molded product will comprise a filter endowed with high permeability, and suitable for filtering the materials noted above.

As will be apparent from the foregoing, the novel process disclosed herein provides an excellent filter, since the adhesive that is mixed with the porous particles is solidified in a porous or reticulate state at the same time that the mixture is retained in a mold that is similar in shape to the desired shape of the filter, and thus the porous filter particles are held stationary during the hardening of the adhesive material.

What is claimed is:

1. A process of preparing a filter medium, comprising:
   (a) mixing solid, porous particles of a filter material with solid laterally adhesive particles in a volumetric ratio of about 3 to 1 to provide a dry mixture,
   (b) confining the mixture within a chamber having a configuration corresponding to the desired shape of the filter medium,
   (c) flowing under pressure into said chamber and onto the mixture therein, saturated vapor of a solvent for said adhesive particles, whereby said vapor is caused to condense upon contact with said mixture into liquid to wet and dissolve said adhesive particles, and
   (d) heating said mixture to vaporize and remove said liquid solvent to thereby solidfy said dissolved adhesive in a reticulate state between said porous particles to secure said porous particles together into a porous mass to form said filter medium.

2. A process for preparing a filter medium as claimed in claim 1, wherein said adhesive particles are larger in size than said porous particles.

3. A process as defined in claim 1, wherein
   said chamber is provided with inlet and output ports and
   said saturated gaseous solvent is supplied under pressure to the inlet port of the chamber for from 10 to 20 minutes before the mixture in the chamber is cured.

References Cited

UNITED STATES PATENTS

| | | | |
|---|---|---|---|
| 2,944,291 | 7/1960 | Prior et al. | 264—123 |
| 3,025,233 | 3/1962 | Figert | 210—496 |
| 3,274,103 | 9/1966 | Adams | 210—75 |
| 3,054,147 | 9/1962 | Archibald | 264—122 |

ROBERT F. WHITE, Primary Examiner

J. R. HALL, Assistant Examiner